United States Patent
Chu et al.

(10) Patent No.: US 10,673,547 B1
(45) Date of Patent: Jun. 2, 2020

(54) METHOD AND APPARATUS FOR COMMUNICATION

(71) Applicant: NXP USA, Inc., Austin, TX (US)

(72) Inventors: Liwen Chu, San Ramon, CA (US); Lei Wang, San Diego, CA (US); Jinjin Jiang, San Jose, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/186,793

(22) Filed: Nov. 12, 2018

Related U.S. Application Data (63) Continuation of application No. 15/589,796, filed on May 8, 2017, now Pat. No. 10,128,966.
(Continued)

(51) Int. Cl.
*H04L 5/00* (2006.01)
*H04W 52/24* (2009.01)
*H04B 17/345* (2015.01)
*H04L 1/00* (2006.01)
*H04W 84/12* (2009.01)
(Continued)

(52) U.S. Cl.
CPC ......... *H04B 17/345* (2015.01); *H04L 1/0025* (2013.01); *H04L 5/0073* (2013.01); *H04L 5/0094* (2013.01); *H04L 47/32* (2013.01); *H04W 16/02* (2013.01); *H04W 16/10* (2013.01);
(Continued)

(58) Field of Classification Search
CPC .. H04B 17/345; H04W 16/02; H04W 52/243; H04W 52/247; H04W 16/10; H04W 84/12; H04L 1/0025; H04L 5/0073; H04L 5/009
See application file for complete search history.

(56) References Cited

U.S. PATENT DOCUMENTS 9,804,918 B1    10/2017   Zhang et al.
9,826,532 B1    11/2017   Chu et al.
(Continued)

FOREIGN PATENT DOCUMENTS

WO    WO-2015/147874 A1    10/2015
WO    WO 2015187860 A1    12/2015

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
(Continued)

*Primary Examiner* — Mohamed A Kamara (57) ABSTRACT

Aspects of the disclosure provide an apparatus for wireless communication. The apparatus includes a transceiver and a processing circuit. The transceiver is configured to transmit and receive wireless signals. The processing circuit is configured to determine a transmission parameter adjustment for the transceiver, detect that the transmission parameter adjustment has a potential to cause a collision to an overlapping basic service set (OBSS), adjust timings for transmission control to avoid the collision, and control the transceiver based on the determined transmission parameter adjustment and the adjusted timings for transmission control.

18 Claims, 7 Drawing Sheets

Related U.S. Application Data (60) Provisional application No. 62/489,825, filed on Apr. 25, 2017, provisional application No. 62/332,752, filed on May 6, 2016.

(51) Int. Cl.
*H04W 16/10* (2009.01)
*H04L 12/823* (2013.01)
*H04W 16/02* (2009.01)

(52) U.S. Cl.
CPC ....... *H04W 52/243* (2013.01); *H04W 52/247* (2013.01); *H04W 84/12* (2013.01)

(56) References Cited

U.S. PATENT DOCUMENTS

| | | | |
|---|---|---|---|
| 9,854,607 B1* | 12/2017 | Chu | H04W 52/241 |
| 9,876,614 B1 | 1/2018 | Sun et al. | |
| 9,942,193 B1 | 4/2018 | Chu et al. | |
| 10,015,736 B2* | 7/2018 | Ong | H04W 48/16 |
| 10,045,340 B1 | 8/2018 | Chu et al. | |
| 10,111,185 B2 | 10/2018 | Chu et al. | |
| 10,117,270 B2* | 10/2018 | Kim | H04B 17/318 |
| 10,128,966 B1* | 11/2018 | Chu | H04B 17/345 |
| 10,251,065 B1 | 4/2019 | Jiang et al. | |
| 10,365,815 B1 | 7/2019 | Stukalov et al. | |
| 10,524,290 B1 | 12/2019 | Chu et al. | |
| 2004/0004973 A1 | 1/2004 | Lee | |
| 2007/0071010 A1 | 3/2007 | Iyer et al. | |
| 2007/0109973 A1* | 5/2007 | Trachewsky | H04W 16/14 370/252 |
| 2007/0110091 A1 | 5/2007 | Kwon | |
| 2008/0144591 A1 | 6/2008 | Jokela | |
| 2010/0020746 A1 | 1/2010 | Zaks | |
| 2011/0230181 A1 | 9/2011 | Carmon | |
| 2012/0099507 A1 | 4/2012 | Zhang et al. | |
| 2012/0224568 A1* | 9/2012 | Freda | H04W 56/0015 370/338 |
| 2012/0327870 A1 | 12/2012 | Grandhi et al. | |
| 2013/0051323 A1* | 2/2013 | Song | H04W 74/085 370/328 |
| 2013/0083712 A1 | 4/2013 | Sadek | |
| 2013/0229996 A1 | 9/2013 | Wang et al. | |
| 2014/0119288 A1 | 5/2014 | Zhu et al. | |
| 2014/0286203 A1 | 9/2014 | Jindal et al. | |
| 2014/0328270 A1 | 11/2014 | Zhu et al. | |
| 2015/0103727 A1 | 4/2015 | Zhang et al. | |
| 2015/0131517 A1 | 5/2015 | Chu et al. | |
| 2015/0163824 A1 | 6/2015 | Krzymien et al. | |
| 2016/0007379 A1 | 1/2016 | Seok | |
| 2016/0014804 A1 | 1/2016 | Merlin et al. | |
| 2016/0050691 A1 | 2/2016 | Jauh et al. | |
| 2016/0065467 A1 | 3/2016 | Wu et al. | |
| 2016/0081010 A1 | 3/2016 | Seok | |
| 2016/0088513 A1* | 3/2016 | Huang | H04W 74/0816 370/328 |
| 2016/0095110 A1* | 3/2016 | Li | H04W 72/1215 370/329 |
| 2016/0165574 A1 | 6/2016 | Chu et al. | |
| 2016/0165589 A1 | 6/2016 | Chu et al. | |
| 2016/0174254 A1 | 6/2016 | Hedayat | |
| 2016/0353275 A1 | 12/2016 | Liu et al. | |
| 2017/0105143 A1 | 4/2017 | Seok | |
| 2017/0171773 A1 | 6/2017 | Cariou | |
| 2017/0289987 A1 | 10/2017 | Seok | |
| 2018/0242176 A1* | 8/2018 | Yang | H04W 24/08 |
| 2018/0279365 A1* | 9/2018 | Wang | H04W 16/14 |

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE Std 802.11h-2003, "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe," The Institute of Electrical and Electronics Engineers, Inc., 75 pages (Oct. 14, 2003).

Itagaki et al., "Dynamic CCA Control and TPC Simulation Results with SS1~SS3," IEEE Draft, IEEE 802.11-15/1045r0 Submission, 54 pages (Sep. 14, 2015).

U.S. Appl. No. 62/086,516, Yongho, "RTS and CTS Procedure for Dynamic CCA," filed Dec. 2, 2014.

* cited by examiner

METHOD AND APPARATUS FOR COMMUNICATION

INCORPORATION BY REFERENCE

This application is a continuation of U.S. application Ser. No. 15/589,796, filed on May 8, 2017, which claims the benefit of U.S. Provisional Application No. 62/332,752, "NAV SETTING RULES WITH DYNAMIC CCA AND UL MU" filed on May 6, 2016, and U.S. Provisional Application No. 62/489,825, "OVERLAPPING BSS (OBSS) PPDU DISCARDING AND BACKOFF" filed on Apr. 25, 2017, the entire contents of which are incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) is used in home, school, office building, store, shopping mall and the like to link two or more devices using wireless connections within a limited area to a network. The WLAN allows users to move around within the limited area and still be connected to the network. In addition, the WLAN can be configured to provide connections to other network, such as, a wide area network, Internet and the like. Generally, WLANs are implemented based on standards, such as IEEE 802.11 standards, and the like.

SUMMARY

Aspects of the disclosure provide an apparatus for wireless communication. The apparatus includes a transceiver and a processing circuit. The transceiver is configured to transmit and receive wireless signals. The processing circuit is configured to determine a transmission parameter adjustment for the transceiver, detect that the transmission parameter adjustment has a potential to cause a collision to an overlapping basic service set (OBSS), adjust timings for transmission control to avoid the collision, and control the transceiver based on the determined transmission parameter adjustment and the adjusted timings for transmission control.

In an embodiment, the processing circuit is configured to add a delay to start a backoff counter that is used to control a backoff time when a transmission medium is idle. In an example, the processing circuit is configured to add the delay that is determined based on a probe delay. In another example, the processing circuit is configured to add the delay that is determined based on a transmission time for a data unit.

In another embodiment, the processing circuit is configured to adjust a network allocation vector (NAV) counter that is used to measure a busy time for a transmission medium. In an example, the processing circuit is configured to adjust the NAV counter based on a previously received data unit from the OBSS.

In an embodiment, the processing circuit is configured to determine an increase of a transmission power in response to a decrease of a clear channel assessment threshold level.

Further, in an example, the transceiver is configured to receive a trigger signal from an access point. The trigger signal is indicative of a minimum transmission power requirement. The processing circuit is configured to allow the transceiver to transmit when the minimum transmission power requirement is satisfied.

In another embodiment, the processing circuit is configured to determine an increase of a transmission power based on a previously received data unit from the OBSS.

Aspects of the disclosure provide a method of wireless communication. The method includes determining, by a processing circuit, a transmission parameter adjustment for a transceiver, detecting that the transmission parameter adjustment has a potential to cause a collision to an overlapping basic service set (OBSS), adjusting timings for transmission control to avoid the collision, and controlling the transceiver based on the determined transmission parameter adjustment, and the adjusted timings for transmission control.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
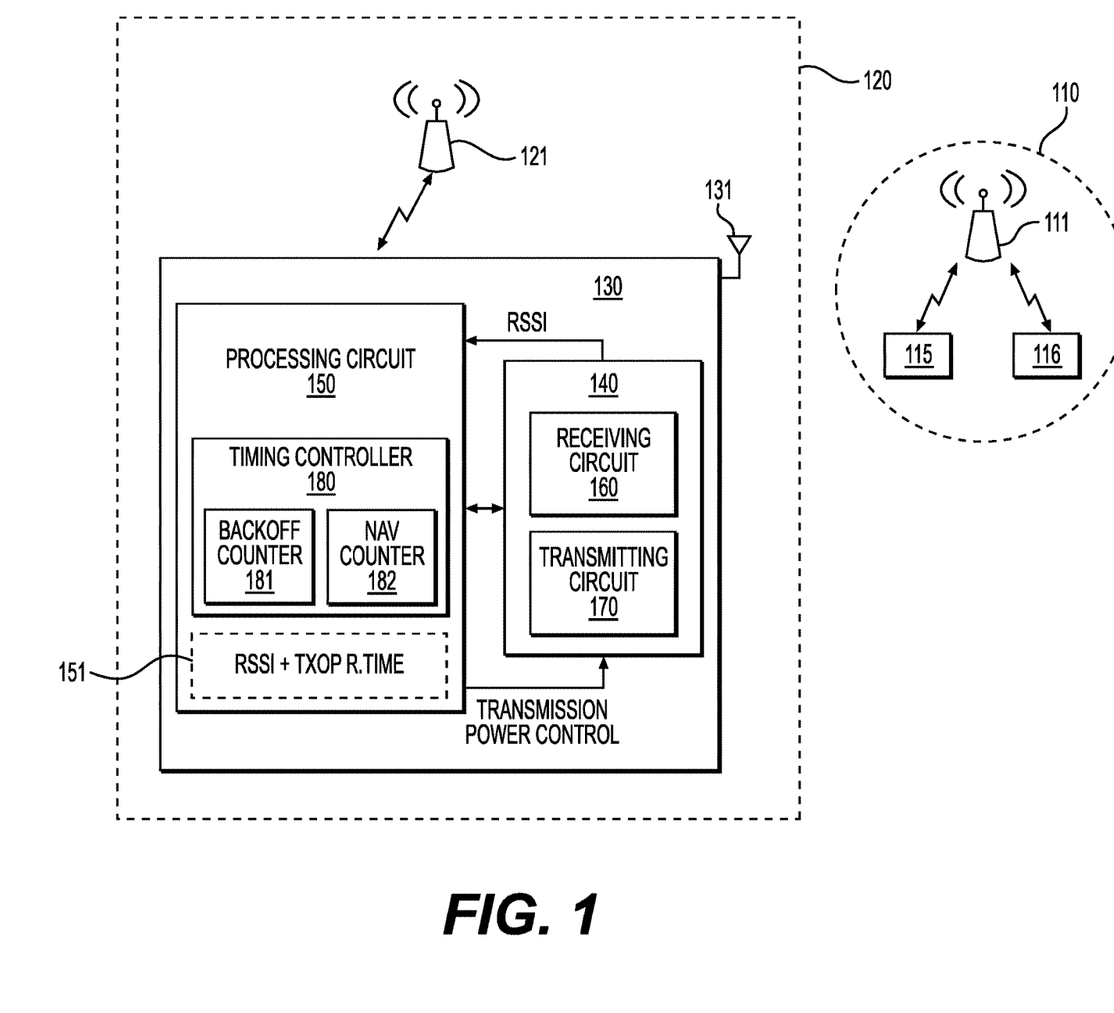
FIG. 1 shows a diagram of a network 100 according to an embodiment of the disclosure.

FIG. 1 shows a diagram of a network 100 according to an embodiment of the disclosure. The network 100 includes a plurality of service sets, such as a first basic service set (BSS) 110, a second BSS 120, and the like. Each service set includes a plurality of devices in wireless communication. For example, the first BSS 110 includes devices 111, 115, 116 and the like in wireless communication, and the second BSS 120 includes devices 121, 130 and the like in wireless communication. In the network 100, at least one device, such as the device 130, is configured to adjust a transmission parameter, such as a transmission power and the like, at a time, determine that the transmission parameter adjustment has a potential to cause a collision to an overlapping basic service set (OBSS), and adjust timings for transmission control to avoid the collision.

The network 100 includes interconnections that are implemented using any suitable network technology, such wired, wireless, a local area network (LAN), a wireless LAN (WLAN), a fiber optical network, a wide area network (WAN), a peer-to-peer network, the Internet, and the like. In an example, the first BSS 110 is implemented using WLAN technology to interconnect the devices 111, 115, 116 and the like; the second BSS 120 is implemented using WLAN technology to interconnect the devices 121, 130 and the like; and the network 100 includes other suitable interconnections (not shown), such as a LAN, a fiber optical network, and the like to provide connections for the first BSS 110 and the second BSS 120 to be connected to for example Internet. It is noted that, in an example, the first BSS 110 and the second BSS 120 belong to a same WLAN; and in another example, the first BSS 110 and the second BSS 120 belong to different WLANs.

According to an aspect of the disclosure, the second BSS 120 is an overlapping basic service set (OBSS) to the first BSS 110. In an embodiment, the first BSS 110 and the second BSS 120 are infrastructure type basic service sets. The first BSS 110 includes an access point (AP) device 111, and station (STA) devices 115 and 116. The STA devices 115 and 116 communicate through the AP device 111, and the AP device 111 includes network hardware and software configured to serve as a bridge to allow the STA devices 115 and 116 to connect to other part of the network 100. Similarly, the second BSS 120 includes AP and STA devices. In an example, the device 121 is an AP device, and the device 130 is a STA device. The STA device 130 communicates though the AP device 121, and the AP device 121 includes network hardware and software configured to serve as a bridge to allow the STA device 130 to connect to other part of the network 100. In the embodiment, the AP device 111 and the STA device 115 communicate using a first frequency communication channel, and the AP device 111 is configured to cover a first service area. The AP 121 and the STA device 130 communicate using a second frequency communication channel, and the AP device 121 is configured to cover a second service area. In the embodiment, the second frequency communication channel overlaps the first frequency communication channel in the frequency domain, and the second service area overlaps the first service area, thus the second BSS 120 is an OBSS to the first BSS 110.

Each of the STA devices in the network 100, such as the STA devices 115, 116, and 130, can be any suitable device, such as a desktop computer, a laptop computer, a tablet computer, a smart phone, a personal digital assistant (PDA), a smart watch, a smart camera, a smart TV, a smart voice recorder, a wearable device, and the like. According to an aspect of the disclosure, the STA devices in the network 100 are implemented using the same version or different versions of a wireless standard, such as various IEEE 802.11 standards.

In an embodiment, the device 130 is configured to dynamically adjust a transmission parameter, such as a transmission power and the like. The transmission parameter adjustment can cause collisions to devices in the overlapping basic service set. In an example, the device 130 is in a close proximity to the STA device 115 in the first BSS 110. At a time, the device 130 increases the transmission power and transmits signals, the transmitted signals have a potential to cause collision at the STA device 115 when the STA device 115 is receiving signals from the AP 111.

According to an aspect of the disclosure, the device 130 is configured to adjust timings for transmission control to avoid the collision. In an embodiment, the device 130 uses a plurality of timing techniques for transmission control, such as a backoff counter, a network allocation vector (NAV) counter, a contention window, and the like. Generally, the contention window is set according to expected communication traffic. For example, when the communication traffic is expected to become heavier, the contention window is set wider. The backoff counter is used by the device 130 to defer an access to transmission medium (e.g., a communication channel) when the transmission medium is idle. In an example, the value in the backoff counter is selected randomly within the contention window. When the transmission medium is idle, the backoff counter counts down by time slots. When the backoff counter in the device 130 decreases to zero, and the transmission medium is still idle, the device 130 can use the transmission medium for transmission. The NAV counter is used by the device 130 to defer an access to the transmission medium due to an ongoing transmission of a data unit by another device on the transmission medium. In an example, a data unit includes a duration field that specifies the transmission time required for the remaining transmit opportunity (TXOP) in an example. The device 130 listens to the transmission medium. When the transmission medium is busy transmitting the data unit, the device 130 decodes the duration field, sets the NAV counter according to the duration field, and starts the NAV counter. In an example, when the NAV counter starts decrement, the device 130 stops the counting down of the backoff counter. When the NAV counter counts to zero, the device 130 starts the counting down of the backoff counter, and listens to the transmission medium again.

In some embodiments, to increase the simultaneous transmission opportunity, a STA device uses higher CCA level to decide whether the medium is busy or idle. Accordingly, the backoff counter is faster to become 0. With the higher CCA level, some PPDUs from neighboring BSS may be ignored. Accordingly the STA that uses higher CCA level to do backoff needs to use lower TX power to transmit its PPDUs. The transmitted PPDUs will not interfere with the ignored OBSS PPDUs. In an embodiment, a STA device can dynamically adjust its TX power and CCA level. In an embodiment, the device 130 is configured to add a delay before restarting the backoff counter with higher CCA level to avoid the collision. In another embodiment, the device 130 is configured to adjust the NAV counter to avoid the collision.

Specifically, in the FIG. 1 example, the device 130 includes a transceiver circuit 140 and a processing circuit 150 coupled together as shown in FIG. 1. In the example, the transceiver circuit 140 includes a receiving circuit 160 and a transmitting circuit 170 that are both coupled to an antenna 131, and the processing circuit 150 includes a timing controller 180.

It is noted that in an example, the device 130 can include multiple antennas, and the receiving circuit 160 and the transmitting circuit 170 can be coupled to separate antennas.

The transceiver circuit 140 is configured to receive and transmit wireless signals. For example, the receiving circuit 160 is configured to generate electrical signals in response to captured electromagnetic waves by the antenna 131, process the electrical signals to extract digital streams from the electrical signals. In an example, the transmitting circuit 170 is configured to receive digital streams, such as management frames, data frames, and the like from for example the processing circuit 150, generate radio frequency (RF) signals to carry the digital streams, and emit electromagnetic waves in the air via the antenna 131 to transmit wireless signals that carry the digital streams.

The receiving circuit 160 is configured to receive wireless signals from various sources. In an example, the receiving circuit 160 is configured to generate electrical signals in response to wireless signals emitted by the AP 121, such as a trigger signal that includes various coordination information from the AP 121, and other downlink signals the like. In the example, the receiving circuit 160 processes the electrical signals and extracts digital streams. The digital streams are provided to the processing circuit 150 for further processing.

In addition, in the example, the receiving circuit 160 is configured to generate electrical signals in response to wireless signals emitted by devices in other BSS. In an example, the first BSS 110 is an overlapping BSS (OBSS) for the second BSS 120. The device 130 is able to generate electrical signals in response to the wireless signals emitted by devices in the first BSS 110, such as the AP 111, the STA devices 115 and 116. In the example, the receiving circuit 160 processes the electrical signals. For example, the receiving circuit 160 extracts digital streams sent by the devices in the OBSS that include various information of the OBSS. The digital streams are provided to the processing circuit 150 for further processing.

It is noted that receiving circuit 160 can extract other suitable information of the received wireless signals, such as signal strengths of the wireless signals, and the like. The extract information is provided to the processing circuit 150 for further processing. In an embodiment, the receiving circuit 160 measures a received signal strength for each received signal, and informs the received signal strength to the processing circuit 150. In an example, the receiving circuit 160 provides a received signal strength indicator (RSSI) that is indicative of a received signal strength to the processing circuit 150.

In the FIG. 1 example, the transmitting circuit 170 also receives control signals for transmission parameters, such as a control signal for a transmission power, and the like, from the processing circuit 150. In an example, the transmitting circuit 170 is configured to emit wireless signals with a power controlled according to the control signal for the transmission power.

The processing circuit 150 is configured to perform various digital processing. In an example, the processing circuit 150 includes baseband processing circuit configured to perform signal processing in baseband, and includes one or more processors. The one or more processors are configured to execute software instructions to perform various functions.

According to an aspect of the disclosure, the device 130 is implemented according to an open systems interconnection model (OSI model) with a plurality of layers, such as a physical (PHY) layer, a media access control (MAC) layer, a network layer, and the like from bottom up. In an example, the PHY layer includes the transceiver 140 and baseband processing circuit in the processing circuit 150. Further, in the example, the MAC layer is implemented using a mix of hardware and software (e.g., firmware). For example, the MAC layer includes a lower portion implemented in circuits, and a higher portion implemented as a processor executing software instructions. In an embodiment, the timing controller 180 is implemented in the lower portion of the MAC layer using circuits. In another embodiment, the timing controller 180 is implemented as a processor executing software instructions.

In the FIG. 1 example, the timing controller 180 includes a backoff counter 181 and a NAV counter 182. In an example, the backoff counter 181 is associated with a first-in-first-out (FIFO) queue that queues data units for transmission. In an example, when the processing circuit 150 determines that the transmission medium (e.g., communication channel) is idle, the backoff counter 181 is started to decrease and the FIFO queue is halt. When the backoff counter 181 decreases to zero and the transmission medium is still idle, the FIFO queue is enabled to output a data unit for transmission. In an example, the NAV counter 182 tracks a remaining time that the transmission medium is busy with an ongoing transmission of a data unit by another device. It is noted that the timing controller 180 can include other suitable timing control components.

According to an aspect of the disclosure, the processing circuit 150 is configured to determine a transmission parameter adjustment for the transmitting circuit 170. Further, the processing circuit 150 detects that the transmission parameter adjustment has a potential to cause a collision to an OBSS, such as the first OBSS 110. Then, the timing controller 180 adjusts the timings for transmission control to avoid the collision.

In an embodiment, the device 130 dynamically changes a clear channel assessment (CCA) threshold and a transmission power for spatial re-use to improve communication efficiencies when one or more overlapping basic service sets (OBSSs) exist. In the example, the device 130 includes a first CCA threshold (e.g., normal CCA level), and a second CCA threshold (e.g., OBSS PD level). The second CCA threshold can be dynamically changed. Generally, the transmission power is associated with the second CCA threshold, and changes with the change of the second CCA threshold.

The device 130 uses the first CCA threshold and the second CCA threshold for spatial re-use with OBSSs. In a spatial re-use example, the device 130 receives, from a transmission medium (e.g., a communication channel), a wireless signal carrying a data unit (e.g., protocol data unit PPDU). Before the data unit is extracted (e.g., by the processing circuit 150), in an example, the receiving circuit 160 measures a signal strength of the wireless signal. The signal strength of the wireless signal is compared to the first CCA threshold at the PHY layer in the device 130 to trigger a clear channel assessment (CCA). For example, at the PHY layer in the device 130, when the signal strength is higher than the first threshold, the PHY layer reports to the MAC layer of the device 130 that the transmission medium is busy and triggers the MAC layer to start a clear channel assessment (CCA). In an example, when the CCA is triggered, the processing circuit 150 stops the backoff counter 181 from decrement, and the signal strength of the wireless signal is compared with the second CCA threshold for the OBSS environment. When the signal strength is below the second CCA threshold and after the data unit is extracted, the processing circuit 150 can detect whether the data unit is from OBSS (e.g., the second BSS 110). In an example, the processing circuit 150 detects the preamble portion of the data unit to look for BSS color information. The BSS color information is indicative of which BSS the data unit comes from. For example, when the BSS color indicates that the data unit is transmitted from the first BSS 110, the processing circuit 150 determines that the wireless signal that carries the data unit is from the OBSS. The MAC address information, i.e. receiver address (RA), transmitter address (TA), BSS identifier (BSSID), and the like can also be used to identify whether the received data unit is from the OBSS or not.

According to an aspect of the disclosure, when the processing circuit 150 detects that the wireless signal that carries the data unit is from the OBSS, and the signal strength is below the second CCA threshold, the processing circuit 150 decides that the medium is idle and count down the backoff counter. In an example, the transmission power is associated with the second CCA threshold. When the second CCA threshold is reduced, the processing circuit 150 increases the transmission power. In an embodiment, when a STA stops the backoff procedure that uses second CCA threshold 1 and starts another backoff procedure that uses second CCA threshold 2, where second CCA threshold 2 is lower than second CCA threshold 1, the STA can use higher TX power to transmit its frames after backoff counter is 0. In another embodiment, after the backoff counter becomes 0 under second CCA threshold 1, a STA transmits its frames until the end of the TXOP, and then the STA starts a new backoff procedure with a lower CCA level, i.e. second CCA threshold 2. The STA can use higher TX power to transmit its frames after backoff counter become 0 again. The transmission power increase can cause collision to the first OBSS 110. In an embodiment, the processing circuit 150 discards the data unit under higher second CCA threshold 1, resets the transmission medium to be idle, ignores the received wireless signal, and not to update the network allocation vector (NAV). In an embodiment, the processing circuit 150 adds a delay to start the backoff counter 181 for a new backoff procedure with lower second CCA threshold. After the delay, the ignored PPDUs under higher second CCA threshold are finished. So the backoff counter 181 can start a new backoff procedure when the transmission medium is idle. In an example, the delay is determined based on a probe delay that is the time used in a probing process for APs. In another example, the delay is determined based on a transmission path of a data unit, such as a sum of the longest transmission time for a PPDU and required inter-frame spaces (e.g., twice of short inter-frame spaces), and the like. In another example, the delay time is the longest TXOP limit. In an embodiment, the starting of a new backoff procedure right away without changing the second CCA threshold is allowed. In an embodiment, the starting of a new backoff procedure right away with higher second CCA threshold is allowed.

It is noted that, in another example, at a time, the processing circuit 150 decides to increase the second CCA threshold. The processing circuit 150 decreases the transmission power that is associated with the second CCA threshold. Then the processing circuit 150 discards the data unit, resets the transmission medium to be idle, ignores the received wireless signal, not to update the network allocation vector (NAV), and restarts the backoff counter 181 to continue to backoff right away.

In another embodiment, when the processing circuit 150 detects that the wireless signal that carries the data unit is from the OBSS, and the signal strength is below the second CCA threshold, the processing circuit 150 stores a record 151 of the data unit, such as the received signal strength (e.g., RSSI) for the data unit, a remaining time for the TXOP (e.g., time slots TXOP R.TIME) extracted from a duration field in the data unit, and the like before the data unit is discarded. The transmission time extracted from the duration field specifies a time duration required for transmitting the data unit. In an example, the record 151 is used by the processing circuit 150 to adjust transmission parameters, such as timings of transmission control, the transmission power and the like.

In an example, the processing circuit 150 is configured to store a record 151 of the received signal strength and the transmission time for a most recently received data unit, update the record 151 when a new data unit is received and use the record 151 for transmission parameter adjustment. In another example, the processing circuit 150 is configured to store a record 151 of the received signal strength and the transmission time for a data unit with the highest received signal strength. When a new data unit is received, the signal strength of the new data unit is compared with the record 151, when the signal strength of the new data unit is higher than the received signal strength in the record 151, the record 151 is updated to the signal strength of the new data unit and the transmission time extracted from the new data unit.

In another example, the processing circuit 150 is configured to store a record 151 of the received signal strength and the transmission time for a data unit with the highest received signal strength in a most recent time window. For example, the processing circuit 150 is configured to dynamically maintain received signal strength and corresponding transmission time of data units received in the most recent time window. The processing circuit 150 selects the highest signal strength, and the corresponding transmission time as the record 151.

In an example, when the processing circuit 150 detects that the wireless signal that carries the data unit is from the OBSS, and the signal strength is below the second CCA threshold, the processing circuit 150 reduces the second CCA threshold. When the second CCA threshold is reduced, the processing circuit 150 increases the transmission power. Further, the processing circuit 150 updates the NAV counter 182 according to the transmission time in the record 151. For example, when the transmission time of the record 151 is higher than the NAV counter 182, the NAV counter 182 is updated to the transmission time of the record 151. The NAV counter 182 is started, and the transmission medium is then considered busy until the NAV counter 182 is zero.

It is noted that, in another example, at a time, the processing circuit 150 decides to increase the second CCA threshold. The processing circuit 150 decreases the transmission power that is associated with the second CCA threshold. Then the processing circuit 150 discards the data unit, resets the transmission medium to be idle right away. The processing circuit 150 ignores the received wireless signal, not to update the network allocation vector (NAV), and starts the backoff counter 181 to continue to backoff right away.

According to another aspect of the disclosure, the processing circuit 150 is configured to determine the transmission power based on the record 151. In an embodiment, the received signal strength in the record 151 is lower than the second CCA threshold, thus the transmission power determined based on the received signal strength is higher than the transmission power determined based on the CCA threshold. Thus, there is higher chance that the transmission power satisfies a minimum transmission power requirement, and that the transmission medium is used for transmission.

Figure 2:
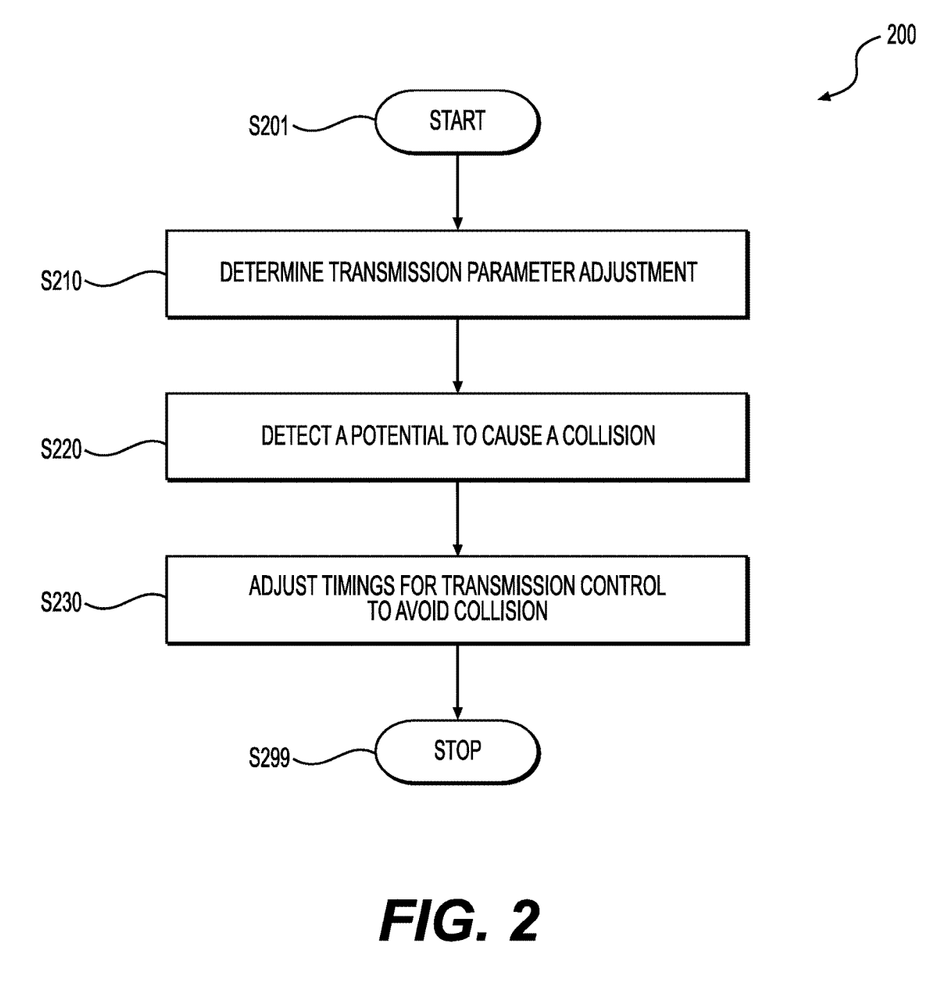
FIG. 2 shows a flow chart outlining a process 200 according to an embodiment of the disclosure.

FIG. 2 shows a flow chart outlining a process 200 according to an embodiment of the disclosure. In an example, the process 200 is executed by the device 130. The process starts at S201 and proceeds to S210.

At S210, transmission parameter adjustment is determined. In an example, the processing circuit 150 determines to change the second CCA threshold, and adjust the transmission power accordingly. In an example, the processing circuit 150 determines to lower the second CCA threshold, and then raises the transmission power accordingly. In another example, the processing circuit 150 determines to raise the second CCA threshold, and then lowers the transmission power accordingly.

At S220, a potential to cause a collision to OBSS is detected. In an example, when the transmission power is raised, a potential collision to OBSS can happen.

At S230, timings for transmission control are adjusted to avoid collision. In an example, a delay to continue backoff is determined. In another example the backoff is not delayed. However if the backoff procedure is done during the delay time, the STA needs to start another backoff procedure instead of transmit the frames. In an example, the delay is determined based on a probe delay. In another example, the delay is determined based on a transmission time of a longest data unit or the longest TXOP limit. The delay is applied to the backoff counter 181 to delay the backoff in an example or to delay the frame transmission. In another example, the NAV counter 182 is updated based on a record of an OBSS data unit with the received signal strength lower than the second CCA threshold. For example, when the OBSS data unit has a longer transmission time than what is in the NAV counter 182, the NAV counter 182 is updated. The adjusted transmission power and the timings are then used for transmission control. Then the process proceeds to S299 and terminates.

Figure 3:
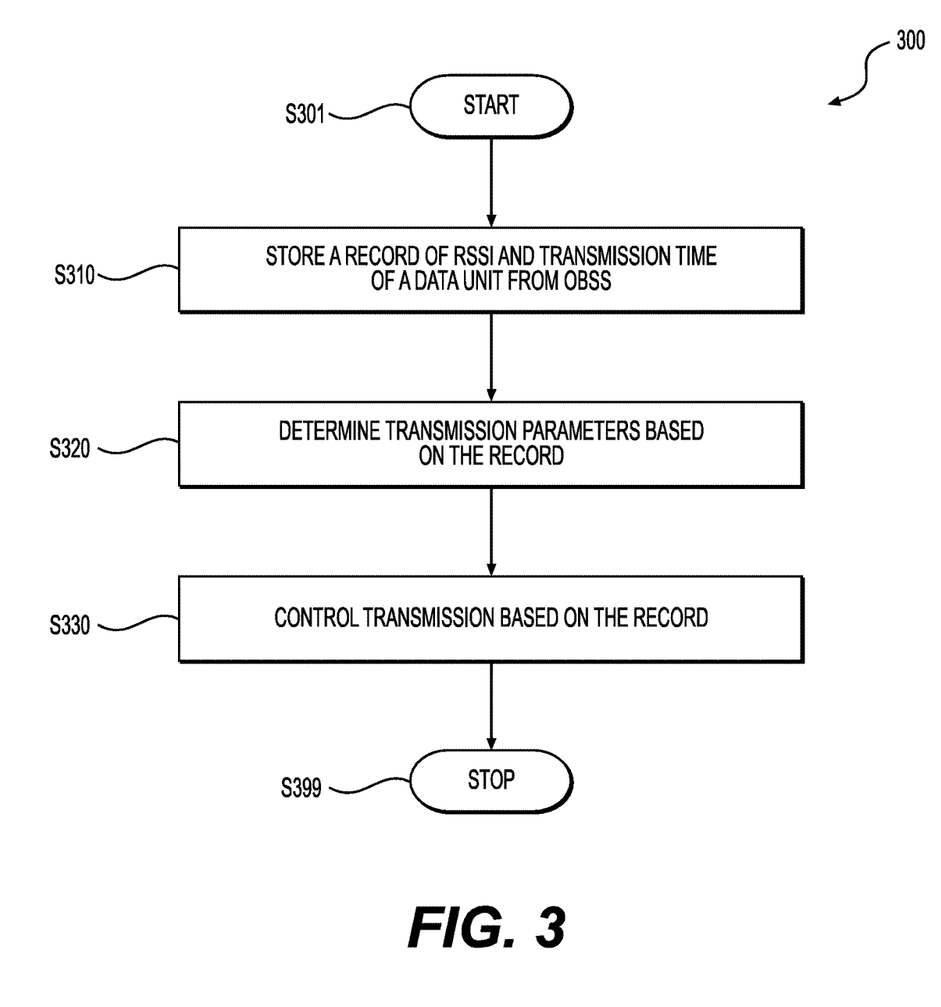
FIG. 3 shows a flow chart outlining a process 300 according to an embodiment of the disclosure.

FIG. 3 shows a flow chart outlining a process 300 according to an embodiment of the disclosure. In an example, the process 300 is executed by the device 130. The process starts at S301 and proceeds to S310.

At S310, a record of an OBSS data unit is stored. In the FIG. 1 example, The device 130 uses the first CCA threshold and the second CCA threshold for spatial re-use with OBSSs. For example, the device 130 receives, from a transmission medium, a wireless signal carrying a data unit (e.g., protocol data unit PPDU). Before the data unit is extracted (e.g., by the processing circuit 150), in an example, the receiving circuit 160 measures a signal strength of the wireless signal. The signal strength of the wireless signal is compared to the first CCA threshold at the PHY layer in the device 130 to trigger a clear channel assessment (CCA). For example, at the PHY layer in the device 130, when the signal strength is higher than the first CCA threshold, the PHY layer reports to the MAC layer of the device 130 that the transmission medium is busy and triggers the MAC layer to start CCA. In an example, when the CCA is triggered, the processing circuit 150 stops the backoff counter 181 from decrement, and the signal strength of the wireless signal is compared with the second CCA threshold for the OBSS environment. When the signal strength is below the second CCA threshold and after the data unit is extracted, the processing circuit 150 can detect whether the data unit is from OBSS (e.g., the second BSS 110). In an example, the processing circuit 150 detects the preamble portion of the data unit to look for BSS color information. The BSS color information is indicative of which BSS the data unit comes from. For example, when the BSS color indicates that the data unit is transmitted from the first BSS 110, the processing circuit 150 determines that the data unit is an OBSS data unit. In another example, the processing circuit 150 detects the address fields in MAC header of the data unit to look for BSS identifier.

Further, the processing circuit 150 stores a record 151 of the data unit, such as the received signal strength (e.g., RSSI) for the data unit, a remaining time of the TXOP (e.g., TXOP R.TIME) extracted from a duration field in the data unit, and the like before the data unit is discarded. In an example, the processing circuit 150 is configured to store a record 151 of the received signal strength and the remaining TXOP time for a most recently received OBSS data unit. In another example, the processing circuit 150 is configured to store a record 151 of the received signal strength and the remaining TXOP time for an OBSS data unit with the highest received signal strength. In another example, the processing circuit 150 is configured to store a record 151 of the received signal strength and the remaining TXOP time for an OBSS data unit with the highest received signal strength in a most recent time window.

At S320, transmission parameters are determined based on the record. In an example, the NAV counter 182 is updated based on the transmission time in the record 151. For example, when the transmission time in the record 151 is longer than the value in the NAV counter 182, the NAV counter 182 is updated. In another example, the transmission power is determined based on the received signal strength in the record 151.

At S330, transmission is controlled based on the transmission parameters that are determined based on the record. In an example, the processing circuit 150 starts the NAV counter 182 with an updated value to avoid collision. In another example, the processing circuit 150 provides power control signal to the transmitting circuit 170. Then the process proceeds to S399 and terminates. In an example, during the time indicated by NAV timer, the adjusted CCA level shall not be lower than the RSSI of the NAV timer.

Figure 4:
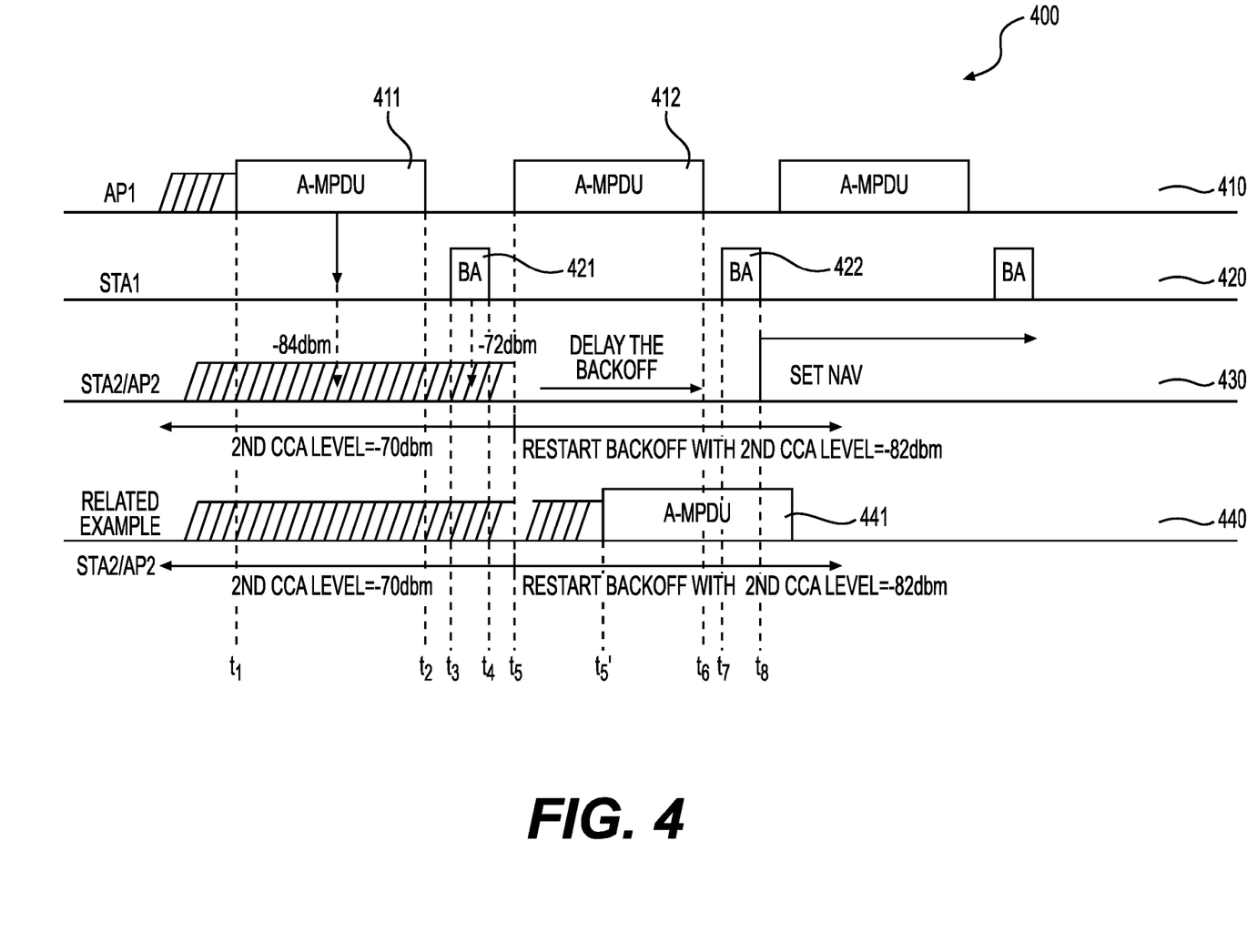
FIGS. 4-7 show plots illustrating events in networks according to embodiments of the disclosure.

FIG. 4 shows a plot 400 illustrating a medium access example with time in the network 100 according to embodiments of the disclosure. The plot 400 shows first medium access 410 by the AP device 111 (AP1), second medium access 420 by the STA device 115 (STA1), third medium access 430 by the device 130 (STA2/AP2), and fourth medium access 440 in a related example. It is noted that the device 130 can be an AP device or a STA device in the FIG. 4 example.

At time t1, the AP1 obtains the medium access opportunity, and transmits data unit 411 (e.g., an aggregated MAC protocol data unit A-MPDU) to the STA1.

At time t2, the AP1 finished the transmission of the data unit 411.

During the time duration from time t1 to time t2, the STA2/AP2 receives wireless signals that carry the data unit 411. In the STA2/AP2, the first CCA threshold is −82 dbm, and the second CCA threshold ($2^{nd}$ CCA level) is −70 dbm in an example. Because the received signal strength corresponding to the data unit 411 is −84 dbm and is lower than the first CCA level, the CCA is not triggered in the example. The data unit 411 is discarded. The medium is considered idle. The STA2/AP2 continues backoff, for example the backoff counter 181 continues counting down.

At time t3, the STA1 received the data unit 411, and responds a block acknowledgement (BA) 421. According to an aspect of the disclosure, an acknowledgment, such as the BA 421, can be transmitted without considering the second CCA level. In an example, the transmission power for transmitting the acknowledgement is not decided based on the second CCA level.

At time t4, the STA1 finished the transmission of the BA 421.

During the time duration from t3 to t4, the STA2/AP2 receives wireless signals that carry the BA 421. In an example, the STA1 is closer to the STA2/AP2 than the AP1, the received signal strength by the STA2/AP2 corresponding to the BA 421 is −72 dbm. The received signal strength is higher than the first CCA threshold, and thus CCA is triggered. In an example, the STA2/AP2 temporally considers that the medium is busy, and stops backoff, for example, the backoff counter 181 stops counting down. The received signal strength is compared with the second CCA threshold, and the BA 421 is decoded to determine whether the BA is from an OBSS. In the example, the BA 421 is from the first BSS which is OBSS to the STA2/AP2, and the received signal strength is lower than the second CCA threshold. The BA 421 is discarded. In an example, the STA2/AP2 determines to decrease the second CCA level, and to increase the transmission power accordingly. In the FIG. 4 example, the STA2/AP2 adds a delay (e.g., a grace period) before continuing backoff. In an example, the delay is long enough for a transmission of a longest data unit in the OBSS, such as the data unit 412 and the like.

It is noted that, in other example, the STA2/AP2 increases the second CCA threshold, and decreases transmission power accordingly. The STA2/AP2 starts the backoff without adding extra delay.

At time t5, the AP1 obtains the medium access opportunity, and transmits data unit 412 to the STA1.

At time t6, the AP1 finished the transmission of the data unit 412.

During the time duration from t5 to t6, the STA2/AP2 delays the backoff, and does not transmit.

At t7, the STA1 received the data unit 412, and responds a BA 422.

At t8, the STA2 finished the transmission of the BA 422.

During the time duration from t7 to t8, the STA2/AP2 receives wireless signals that carry the BA 422. The received signal strength corresponding to the BA 422 is −72 dbm. The received signal strength is higher than the first CCA threshold, and thus CCA is triggered. In an example, the STA2/AP2 temporally considers that the medium is busy, and stops backoff, for example, the backoff counter 181 stops counting down. The received signal strength is compared with the second CCA threshold, and the BA 422 is decoded to determine whether the BA is from an OBSS. In the example, the BA 422 is from the first BSS which is OBSS to the STA2/AP2, the received signal strength is higher than the second CCA threshold, thus the STA2/AP2 considers the medium is busy. Further, in the example, the STA2/AP2 reads the duration field in the BA 422, sets NAV counter 182 according to the value in the duration field of the BA 422, and starts the NAV counter 182 to count down.

In the related example, during the time duration from t5 to t6, the STA2/AP2 continues backoff, and the when the backoff counter reaches zero for example at t5', the STA2/AP2 starts transmitting a data unit 441 for example. In an example, the second CCA threshold decreases by 12 dbm, thus the STA2/AP2 increases the transmission power by 12 dbm. The transmission of the data unit 441 can cause a collision to the STA1 when the STA1 receives the data unit 412 from the AP1 in an example.

Figure 5:
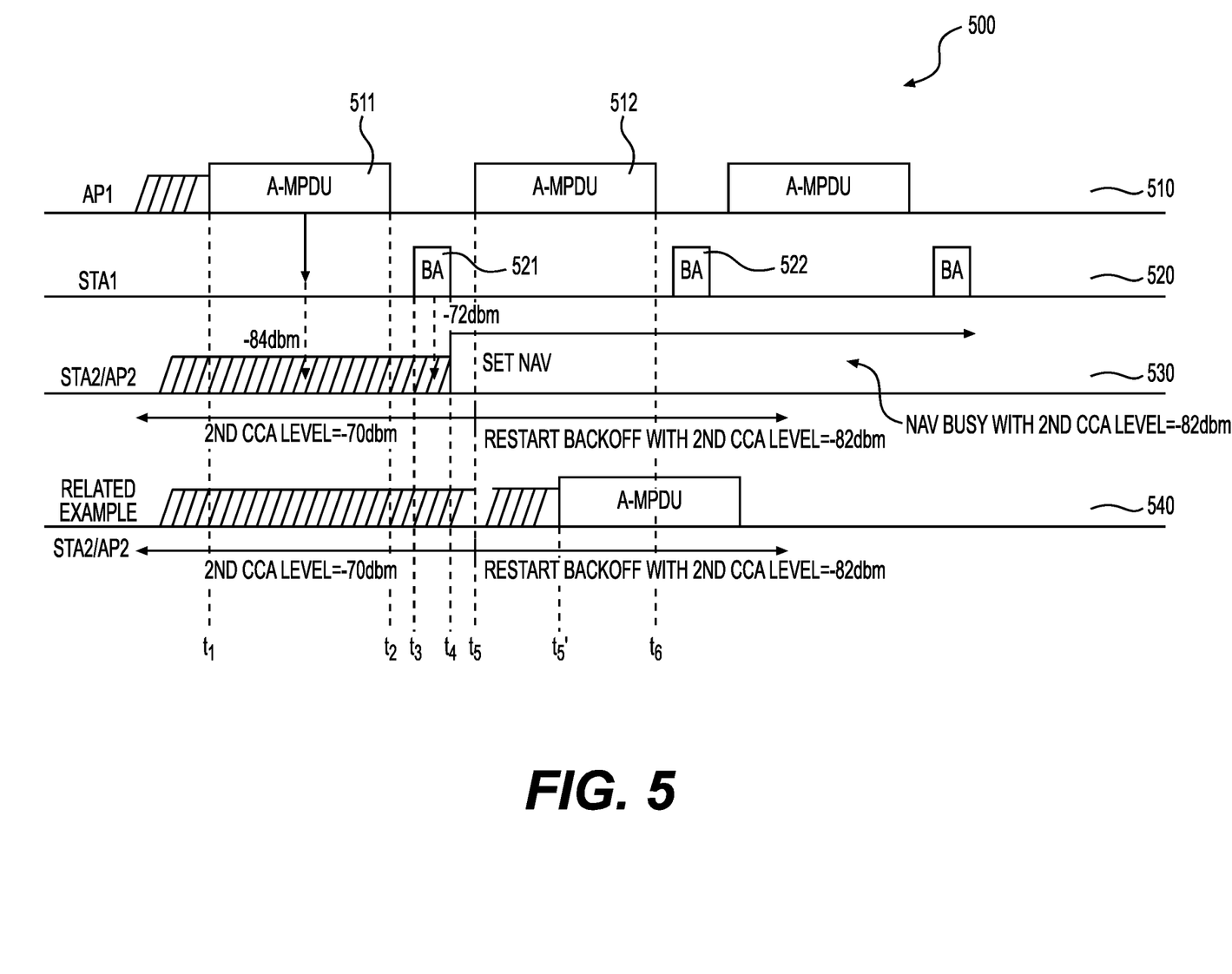

FIG. 5 shows a plot 500 illustrating a medium access with time in the network 100 according to embodiments of the disclosure. The plot 500 shows first medium access 510 by the AP device 111 (AP1), second medium access 520 by the STA device 115 (STA1), third medium access 530 by the device 130 (STA2/AP2), and fourth medium access 540 in a related example. It is noted that the device 130 can be an AP device or a STA device in the FIG. 5 example.

At time t1, the AP1 obtains the medium access opportunity, and transmits data unit 511 (e.g., an aggregated MAC protocol data unit A-MPDU) to the STA1.

At time t2, the AP1 finished the transmission of the data unit 511.

During the time duration from t1 to t2, the STA2/AP2 also receives wireless signals that carry the data unit 511. In the STA2/AP2, the first CCA level is −82 dbm, and the second CCA level is −70 dbm in an example. Because the received signal strength corresponding to the data unit 511 is −84 dbm and is lower than the first CCA level, thus the CCA is not triggered in the example. The data unit 511 is discarded by the STA2/AP2. The medium is considered idle. The STA2/AP2 continues backoff, for example the backoff counter 181 continues counting down.

At time t3, the STA1 received the data unit 511, and responds a block acknowledgement (BA) 521.

At time t4, the STA2 finished the transmission of the BA 521.

During the time duration from t3 to t4, the STA2/AP2 also receives wireless signals that carry the BA 521. The received signal strength corresponding to the BA 521 is −72 dbm. The received signal strength is higher than the first CCA threshold, and thus CCA is triggered. In an example, the STA2/AP2 temporally considers that the medium is busy, and stops backoff, for example, the backoff counter 181 stops counting down. The received signal strength is compared with the second CCA threshold, and the BA 421 is decoded to determine whether the BA 521 is from an OBSS. In the example, the BA 521 is from the first BSS which is OBSS to the STA2/AP2, and the received signal strength is lower than the second CCA threshold.

According to an aspect of the disclosure, the STA2/AP2 stores the record 151 including the received signal strength of the BA 521 and the transmission time in the duration field of the BA 521. In an example, the duration field includes a transmission time to protect (e.g., longer than) a following data unit (e.g., data unit 512) transmission and a response (e.g., BA 522) transmission. Then, the BA 521 is discarded.

In an example, the STA2/AP2 decreases the second CCA level, and increases transmission power accordingly. In an example, the STA2/AP2 selects the larger one of the current value in the NAV counter 182 or the transmission time in the record 151. For example, when the current value in the NAV counter 182 is larger than the transmission time in the record 151, the NAV counter 182 keeps the current value. When the current value of the NAV counter 182 is smaller than the transmission time in the record 151, the NAV counter 182 is updated to the transmission time in the record 151. Then the STA2/AP2 starts the NAV counter 182 to count down.

At t5, the AP1 obtains the medium access opportunity, and transmits data unit 512 to the STA1.

At t6, the AP1 finished the transmission of the data unit 512.

During the time duration from t5 to t6, the NAV counter 182 still counts down, and the STA2/AP2 does not transmit.

In the related example, during the time duration from t5 to t6, the STA2/AP2 continues backoff, and the when the backoff counter reaches zero for example at t5', the STA2/AP2 starts transmitting a data unit 541 for example. In an example, the second CCA level decreases by 12 dbm, thus the STA2/AP2 increases the transmission power by 12 dbm. The transmission of the data unit 541 can cause a collision to the STA1 when the STA1 receives the data unit 512 from the AP1 in an example.

Figure 6:
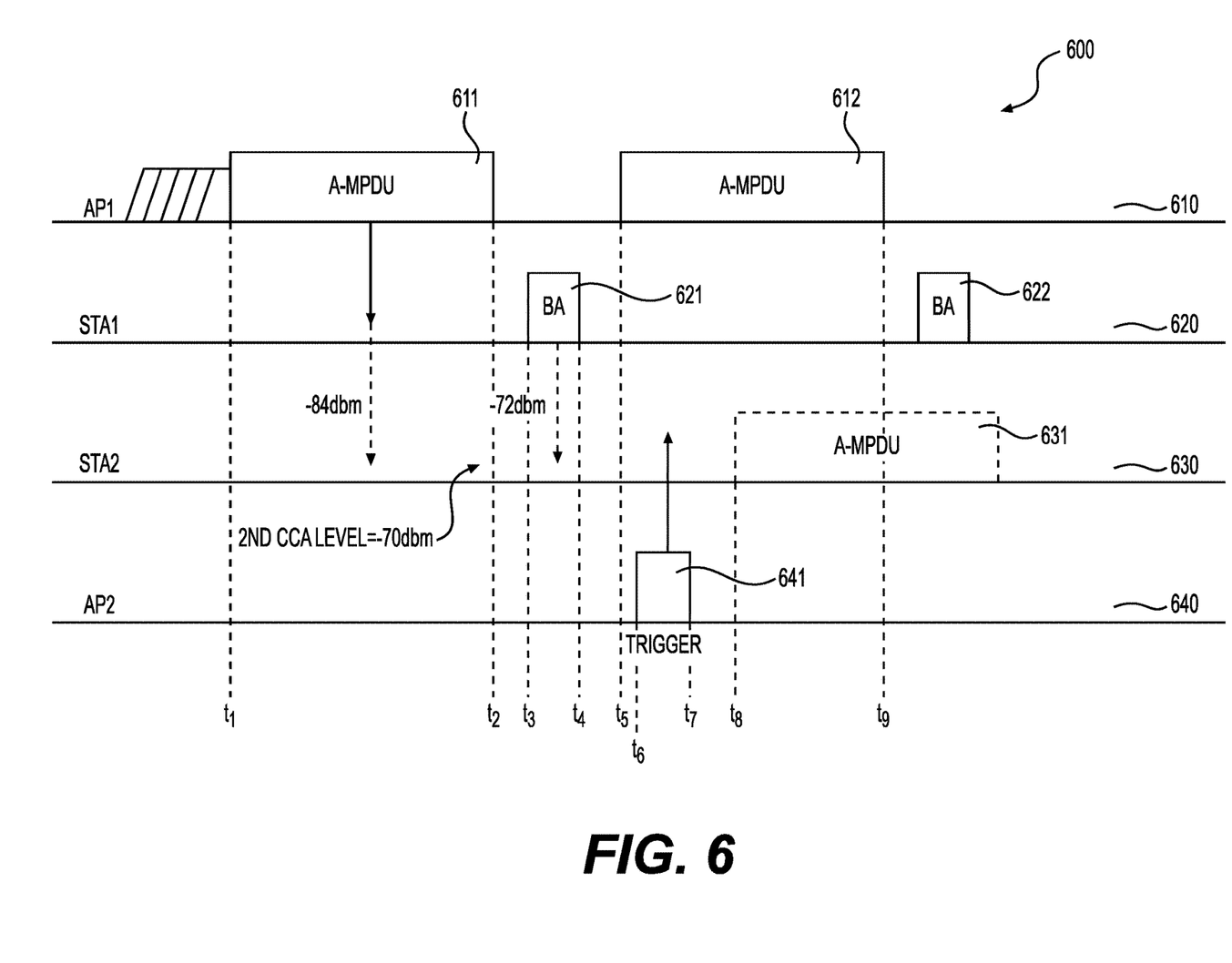

FIG. 6 shows a plot 600 illustrating a medium access with time in the network 100 according to embodiments of the disclosure. The plot 600 shows first medium access 610 by the AP device 111 (AP1), second medium access 620 by the STA device 115 (STA1), third medium access 630 by the device 130 (STA2), and fourth medium access 640 by the AP device 121 (AP2) in an example. It is noted that the device 130 is a STA device in the FIG. 6 example.

At time t1, the AP1 obtains the medium access opportunity, and transmits data unit 611 (e.g., an aggregated MAC protocol data unit A-MPDU) to the STA1.

At time t2, the AP1 finished the transmission of the data unit 611.

During the time duration from t1 to t2, the STA2 receives wireless signals that carry the data unit 611. In the STA2, the first CCA level is −82 dbm, and the second CCA level is −70 dbm in an example. Because the received signal strength corresponding to the data unit 611 is −84 dbm and is lower than the first CCA level, thus the CCA is not triggered in the example. The data unit 611 received at the STA2 is discarded. The medium is considered idle. In an example, the STA2 and AP2 do not have information to transmit at the time.

At time t3, the STA1 received the data unit 611, and responds a block acknowledgement (BA) 621.

At time t4, the STA2 finished the transmission of the BA 621.

During the time duration from t3 to t4, the STA2/AP2 receives wireless signals that carry the BA 621. The received signal strength corresponding to the BA 621 is −72 dbm. The received signal strength is higher than the first CCA threshold, and thus CCA is triggered. In an example, the STA2 temporally considers that the medium is busy, and stops backoff, for example, the backoff counter 181 stops counting down. The received signal strength is compared with the second CCA threshold, and the BA 621 is decoded to determine whether the BA 621 is from an OBSS. In the example, the BA 621 is from the first BSS which is OBSS to the STA2, and the received signal strength is lower than the second CCA threshold. Then, the BA 521 is discarded.

In an example, the STA2 maintains the second CCA level. The backoff counter 181 continues counting down.

At t5, the AP1 obtains the medium access opportunity, and transmits data unit 512 to the STA1.

At t6, the AP2 transmits a trigger signal 641. The trigger signal carries a Trigger frame with information indicative of a transmission power requirement for the STA2. In an example, the trigger signal carries a minimum receiving power requirement at the AP2, and a transmission power of the AP2. When the STA2 receives the trigger signal with a received signal strength, the STA2 calculates a path loss using the transmission power of the AP2 and the received signal strength by the STA2. Then, the STA2 calculates the minimum transmission power requirement based on the path loss and the minimum receiving power requirement carried in the trigger signal.

At t7, the AP2 finished transmission of the trigger signal 641.

At t8, the STA2 decides whether to transmit a data unit. In an example, the backoff counter 181 reaches zero. The STA2 determines an uplink transmission power based on the second CCA threshold. When the allowed uplink transmission power under second CCA threshold is higher than the transmission power requirement indicated by Trigger frame, the STA2 transmits a data unit 631; and when the allowed uplink transmission power is lower than the transmission power requirement indicated by Trigger frame, the STA2 does not transmit the data unit 631.

Figure 7:
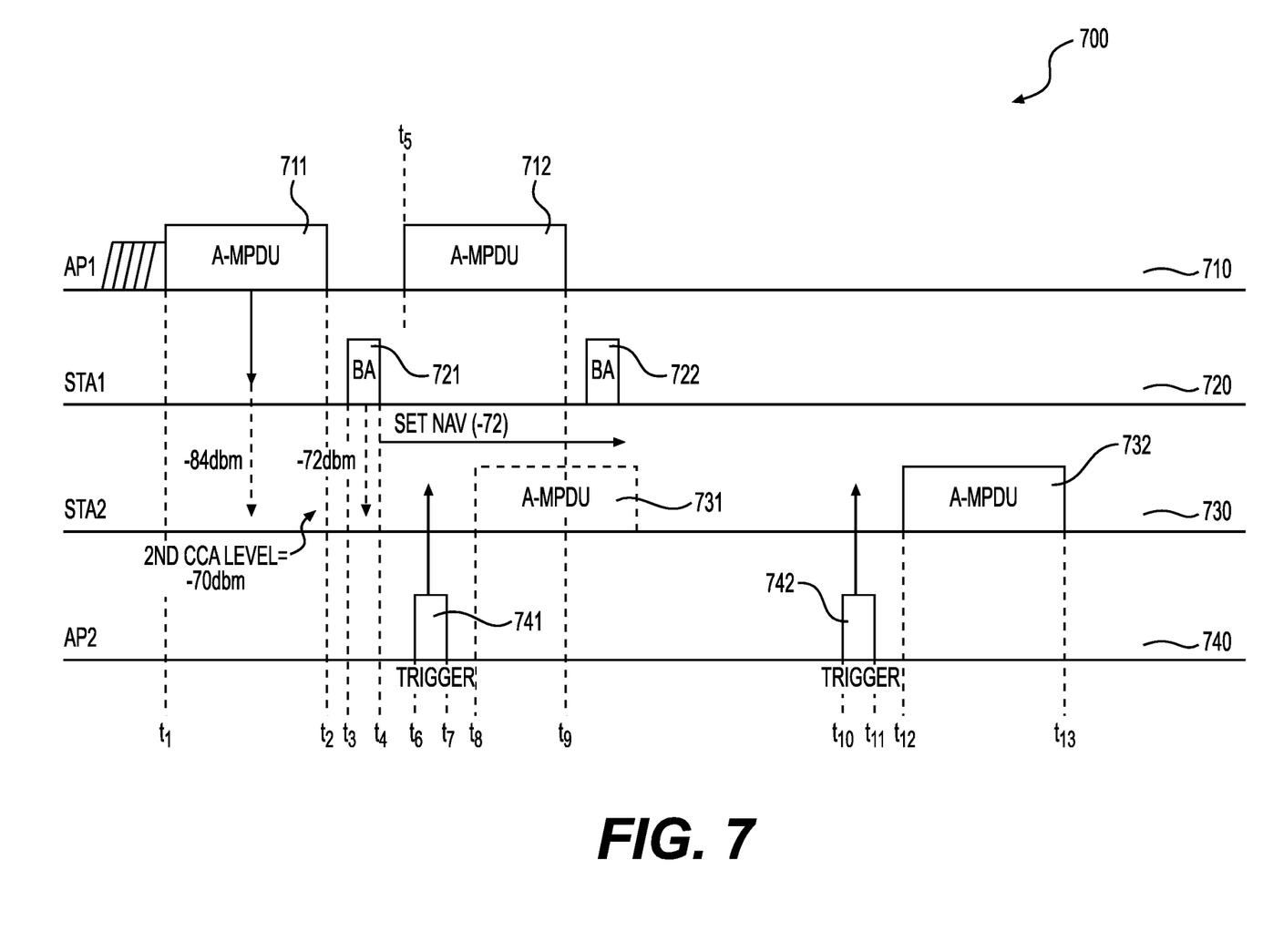

FIG. 7 shows a plot 700 illustrating a medium access with time in the network 100 according to embodiments of the disclosure. The plot 700 shows first medium access 710 by the AP device 111 (AP1), second medium access 720 by the STA device 115 (STA1), third medium access 730 by the device 130 (STA2), and fourth medium access 740 by the AP device 121 (AP2) in an example. It is noted that the device 130 is a STA device in the FIG. 7 example.

At time t1, the AP1 obtains the medium access opportunity, and transmits data unit 711 (e.g., an aggregated MAC protocol data unit A-MPDU) to the STA1.

At time t2, the AP1 finished the transmission of the data unit 711.

During the time duration from t1 to t2, the STA2 receives wireless signals that carry the data unit 711. In the STA2, the first CCA level is −82 dbm, and the second CCA level is −70 dbm in an example. Because the received signal strength corresponding to the data unit 611 is −84 dbm and is lower than the first CCA level. Thus, the CCA is not triggered in the example. The data unit 711 received at the STA2 is discarded. The medium is considered idle. In an example, the STA2 and AP2 do not have information to transmit at the time.

At time t3, the STA1 received the data unit 711, and responds a block acknowledgement (BA) 721.

At time t4, the STA2 finished the transmission of the BA 721.

During the time duration from t3 to t4, the STA2 receives wireless signals that carry the BA 721. The received signal strength corresponding to the BA 721 is −72 dbm. The received signal strength is higher than the first CCA threshold, and thus CCA is triggered. In an example, the STA2 temporally considers that the medium is busy, and stops backoff, for example, the backoff counter 181 stops counting down. The received signal strength is compared with the second CCA threshold, and the BA 721 is decoded to determine whether the BA 721 is from an OBSS. In the example, the BA 721 is from the first BSS which is OBSS to the STA2, and the received signal strength is lower than the second CCA threshold.

According to an aspect of the disclosure, the STA2 stores a record of the received signal strength (e.g., −72 dbm) and the transmission time in the duration field of the BA 721. In an example, the duration field includes a transmission time to protect (e.g., longer than) a following data unit (e.g., data unit 712) transmission and a response (e.g., BA 722) transmission. Then, the BA 721 is discarded.

In an example, the STA2 selects the larger one of the current value in the NAV counter 182 or the transmission time in the record. For example, when the current value in the NAV counter 182 is larger than the transmission time in the record, the NAV counter 182 keeps the current value. When the current value in the NAV counter 182 is smaller than the transmission time in the record, the NAV counter 182 is updated with the transmission time. Then the STA2 starts the NAV counter 182 to count down.

At t5, the AP1 obtains the medium access opportunity, and transmits data unit 712 to the STA1.

At t6, the AP2 transmits a trigger signal 741. The trigger signal carries a Trigger frame with information indicative of a transmission power requirement for the STA2. In an example, the trigger signal carries a minimum receiving power requirement at the AP2, and a transmission power of the AP2. When the STA2 receives the trigger signal with a received signal strength, the STA2 calculates a path loss using the transmission power of the AP2 and the received signal strength by the STA2. Then, the STA2 calculates the minimum transmission power requirement based on the path loss and the minimum receiving power requirement carried in the trigger signal.

At t7, the AP2 finished transmission of the trigger signal 741.

At t8, the NAV counter 182 is not zero. The STA2 does not transmit if the allowed uplink transmission power associated with NAV's RSSI (e.g., the uplink transmission power is determined based on the RSSI of a received signal, and the NAV counter is also determined based on the received signal) is lower than the transmission power requirement indicated by the Trigger frame. In another example, the STA2 transmits if the allowed uplink transmission power associated with NAV's RSSI is lower than the transmission power requirement indicated by the Trigger frame.

At t9, the AP1 finished the transmission of the data unit 712.

At t10, the AP2 transmits a trigger signal 742.

At t11, the AP2 finished transmission of the trigger signal 742.

At t12, the STA2 determines the transmission power based on the record 151.

In the example, the received signal strength in the record 151 (e.g., −72 dbm), is lower than the second CCA threshold (e.g., −70 dbm), thus the transmission power determined based on the received signal strength is higher than the transmission power determined based on the second CCA threshold. Thus, there is higher chance that the transmission power satisfies the minimum transmission power requirement. In the FIG. 7 example, the STA2 determines that the transmission power satisfies the minimum transmission power requirement and obtains the medium access opportunity and transmits a data unit 732.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for wireless communication, comprising: a transceiver configured to transmit and receive wireless signals; and a processing circuit configured to:
   determine that an energy threshold for determining whether a communication channel is idle is to be lowered to a new threshold value;
   in connection with determining that the energy threshold is to be lowered to the new threshold value, determine a time delay period corresponding to a start time for using the new threshold value; and
   in connection with determining that the energy threshold is to be lowered to the new threshold value, use the new threshold value to determine whether the communication channel is idle at the start time after the time delay period.

2. The apparatus of claim 1, wherein the processing circuit is further configured to:
   use the new threshold value to determine whether the communication channel is idle in connection with a backoff procedure.

3. The apparatus of claim 1, wherein the processing circuit is further configured to:
   determine the time delay period based on a transmission time for a data unit.

4. The apparatus of claim 1, wherein the processing circuit is further configured to:
   determine the time delay period based on a probe delay corresponding to a probing process for a wireless local area network (WLAN).

5. The apparatus of claim 1, wherein the processing circuit is further configured to:
   in connection with determining that the energy threshold is to be raised, use the new threshold value to determine whether the communication channel is idle without waiting until after the time delay period.

6. The apparatus of claim 1, wherein the processing circuit is further configured to determine an increase of a transmission power in response to a decrease of the energy threshold.

7. The apparatus of claim 6, wherein:
   the transceiver is configured to receive a trigger signal from an access point, the trigger signal including an indication of a minimum transmission power requirement; and
   the processing circuit is further configured to allow the transceiver to transmit when the minimum transmission power requirement is satisfied.

8. The apparatus of claim 1, wherein the processing circuit is further configured to determine an increase of a transmission power based on a previously received data unit from an overlapping basic service set (OBSS).

9. The apparatus of claim 8, wherein:
   the transceiver is configured to receive a trigger signal from an access point, the trigger signal being including an indication of a minimum transmission power requirement; and
   the processing circuit is further configured to allow the transceiver to transmit when the minimum transmission power requirement is satisfied.

10. A method for wireless communication, the method comprising:
    determining, at a wireless communication device, that an energy threshold for the wireless communication device to determine whether a communication channel is idle is to be lowered to a new threshold value;
    in connection with determining that the energy threshold is to be lowered to the new threshold value, determining, at the wireless communication device, a time delay period corresponding to a start time for the wireless communication device to use the new threshold value; and
    in connection with determining that the energy threshold is to be lowered to the new threshold value, using, at the wireless communication device, the new threshold value to determine whether the communication channel is idle at the start time after the time delay period.

11. The method of claim 10, wherein:
    using the new threshold value to determine whether the communication channel is idle comprises using the new threshold value to determine whether the communication channel is idle in connection with a backoff procedure performed by the wireless communication device.

12. The method of claim 10, wherein:
    determining the time delay period comprises determining the time delay period based on a transmission time for a data unit.

13. The method of claim 10, wherein:
    determining the time delay period comprises determining the time delay period based on a probe delay corresponding to a probing process for a wireless local area network (WLAN).

14. The method of claim 10, further comprising:
    in connection with determining that the energy threshold is to be raised, using, at the wireless communication device, the new threshold value to determine whether the communication channel is idle without waiting until after the time delay period.

15. The method of claim 10, further comprising:
    determining, at the wireless communication device, an increase of a transmission power of the wireless communication device in response to a decrease of the energy threshold level.

16. The method of claim 15, further comprising:
receiving, at the wireless communication device, a trigger signal from an access point, the trigger signal including an indication of a minimum transmission power requirement; and
transmitting, by the wireless communication device, in response to determining that the minimum transmission power requirement is satisfied.

17. The method of claim 10, further comprising:
determining, at the wireless communication device, an increase of a transmission power based on a previously received data unit from an overlapping basic service set (OBSS).

18. The method of claim 17, further comprising:
receiving, at the wireless communication device, a trigger signal from an access point, the trigger signal being including an indication of a minimum transmission power requirement; and
transmitting, by the wireless communication device, in response to determining that the minimum transmission power requirement is satisfied.

* * * * *